June 25, 1946.　　L. J. MAXSON ET AL　　2,402,654
SCREW TYPE CATAPULT
Filed Aug. 22, 1938　　4 Sheets-Sheet 1
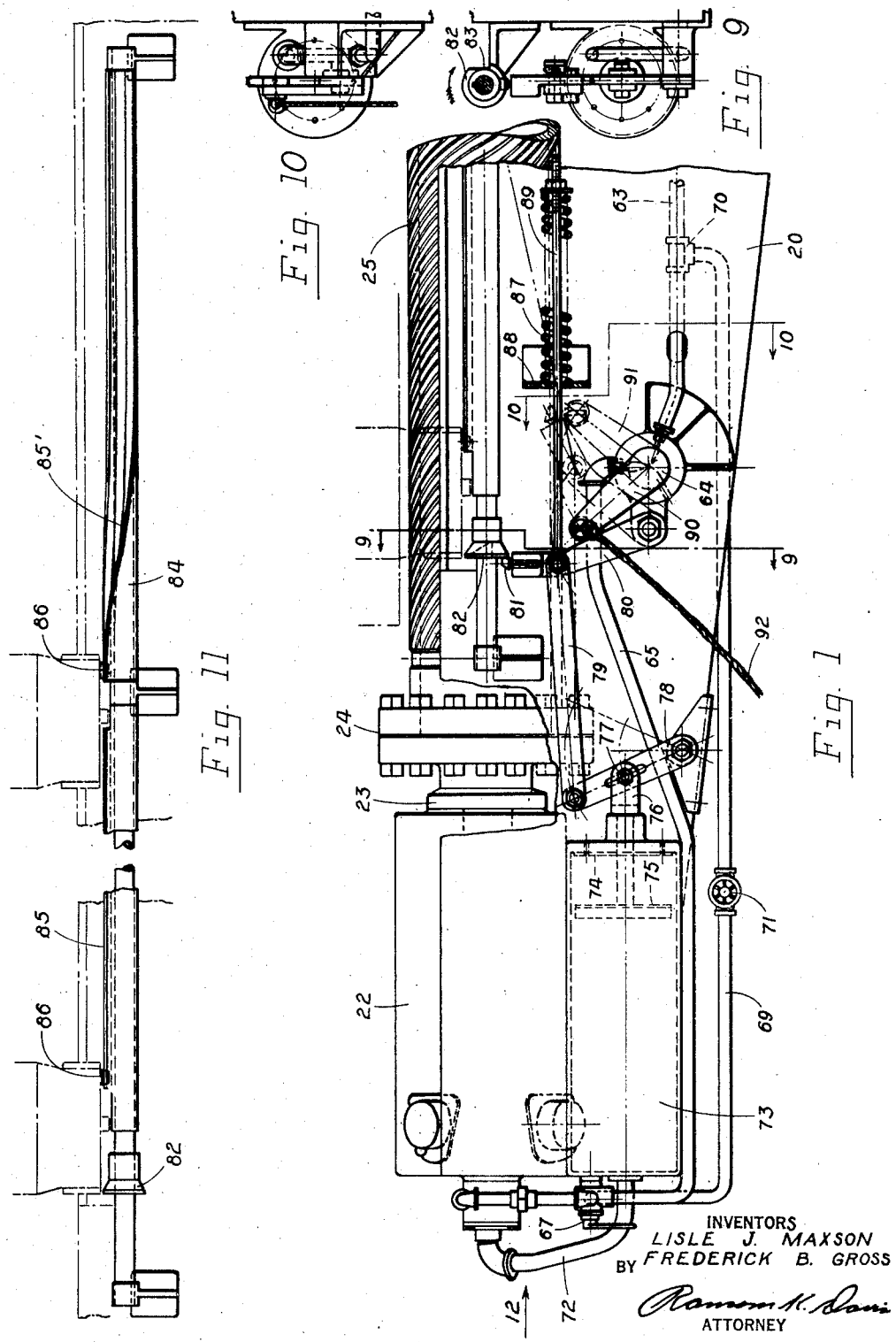
INVENTORS
LISLE J. MAXSON
BY FREDERICK B. GROSS
ATTORNEY June 25, 1946.　　L. J. MAXSON ET AL　　2,402,654
SCREW TYPE CATAPULT
Filed Aug. 22, 1938　　4 Sheets-Sheet 2
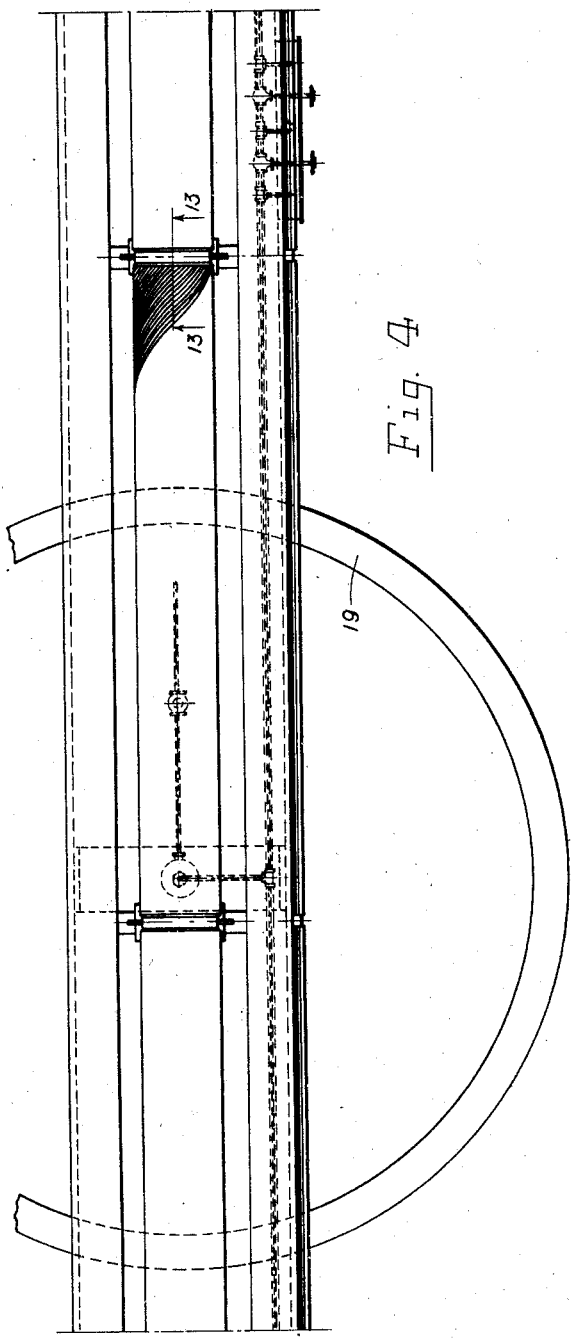
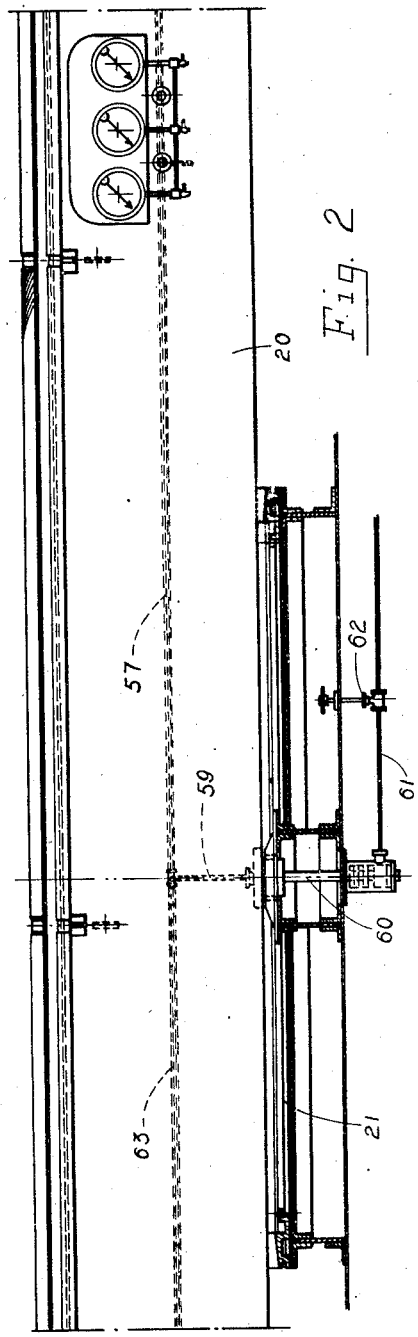
INVENTORS
LISLE J. MAXSON
BY FREDERICK B. GROSS
ATTORNEY

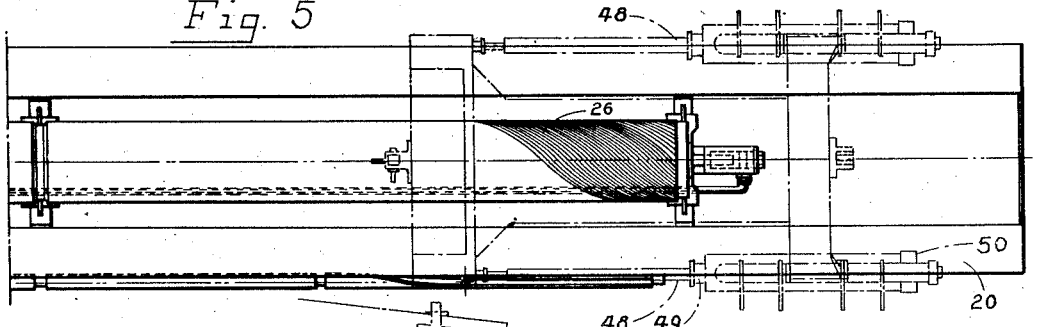
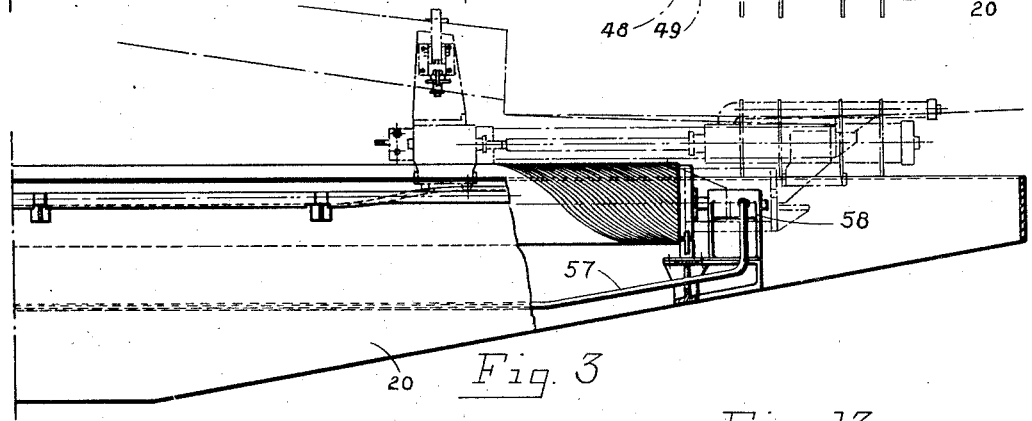
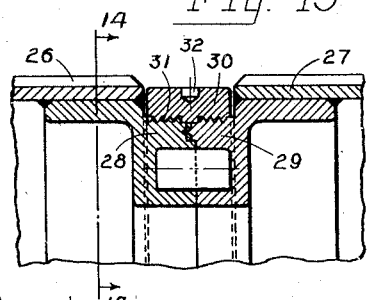
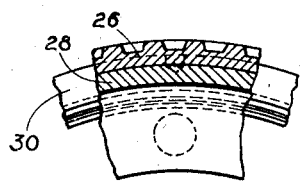
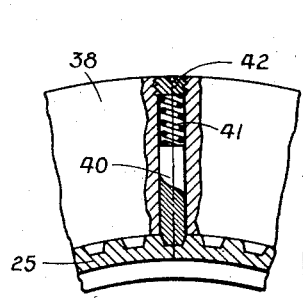
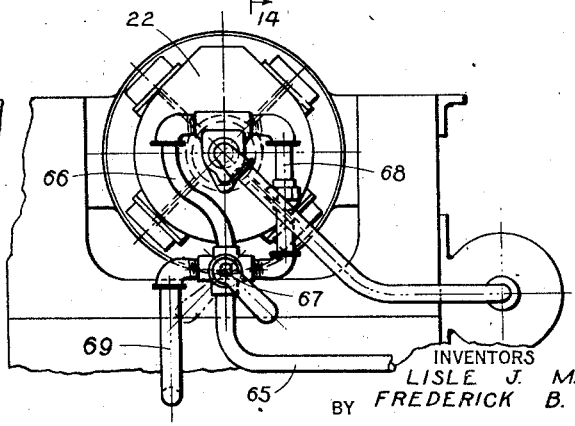

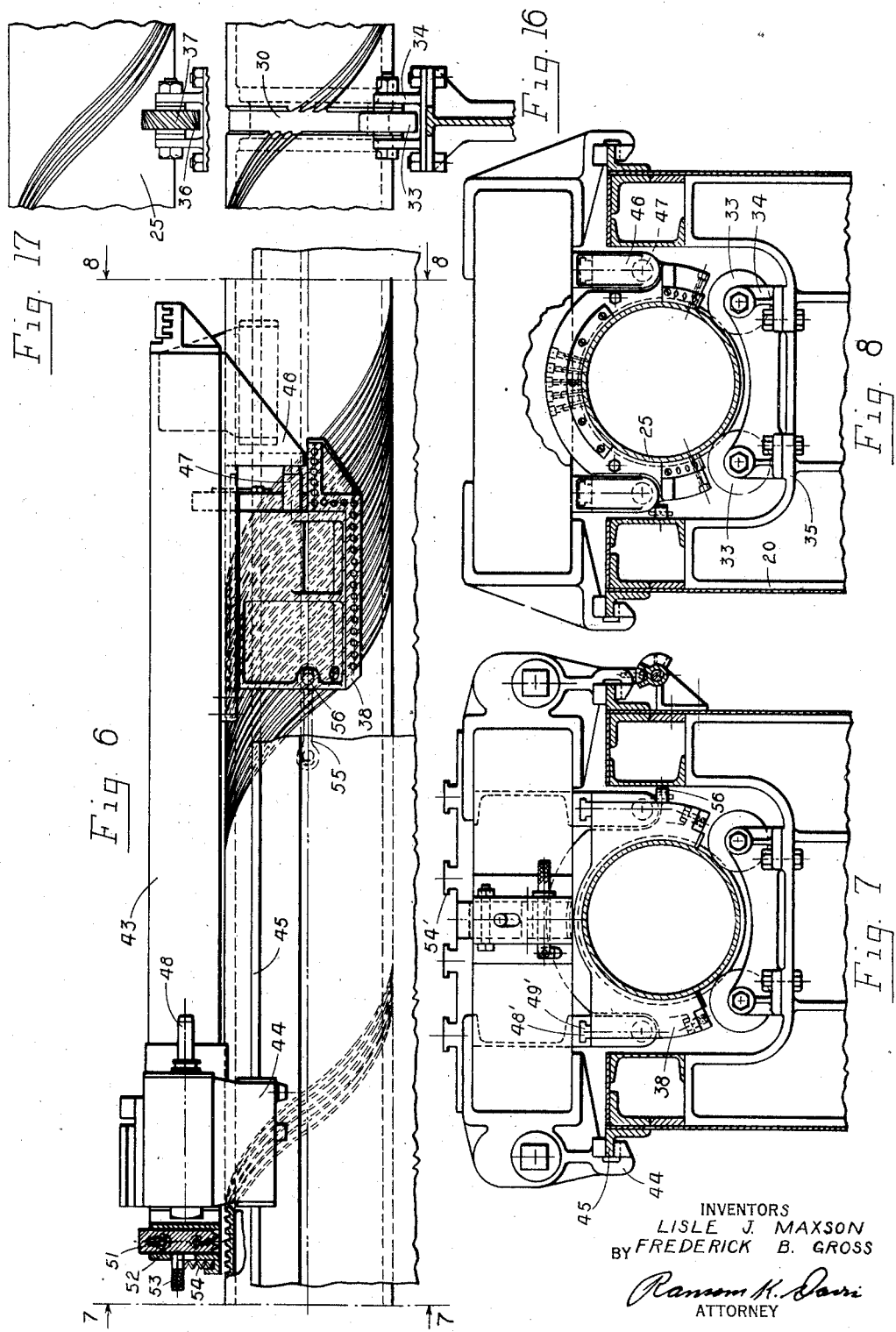

Patented June 25, 1946

2,402,654

UNITED STATES PATENT OFFICE 2,402,654

SCREW TYPE CATAPULT

Lisle J. Maxson, United States Navy, and Frederick B. Gross, Langley, Va.

Application August 22, 1938, Serial No. 226,108

9 Claims. (Cl. 244—63)

(Granted under the act of March 3, 1883, as amended April 30, 1928; 370 O. G. 757)

This invention relates to a screw type catapult, and has for an object to provide an improved catapult for launching aircraft, particularly of the seaplane type.

A further object of this invention is to provide a catapult which is pneumatically operated and which does not use any cables, but instead transmits the motion from a pneumatic engine to a carriage supporting the aircraft by means of a rotatable screw thread.

A further object of this invention is to provide a catapult screw for launching an aircraft, which catapult screw is hollow and likewise serves as a pneumatic reservoir for storing the pressure to actuate the pneumatic engine which rotates the screw.

Still a further object of this invention is to provide a screw advanced aircraft carriage for launching the aircraft at the end of its run, which carriage is retractible by reversing the operation of the screw.

A further object of this invention is to provide an acceleration shock absorber between the aircraft carriage and the screw saddle so as to smooth out the starting shock and to further provide buffer means, the greater part of which is mounted on a stationary support and the smaller part of which is borne by the carriage so as to smooth out the stopping shock.

With the foregoing and other objects in view, the invention consists in the construction, combination and arrangement of parts hereinafter described and illustrated in the drawings, in which, Fig. 1 is a side elevational view of the catapult screw and the screw rotating pneumatic engine end of the screw.

Fig. 2 is a schematic view, partly in section, of the middle portion of the screw, being substantially a continuation of that shown in Fig. 1.

Fig. 3 is a similar view of the launching end of the screw, being a continuation of the portion shown in Fig. 2.

Fig. 4 is a top plan view of the portion of Fig. 2, also showing the turntable track.

Fig. 5 is a similar top plan view of the launching end of Fig. 3.

Fig. 6 is a side elevational view of the catapult screw and the launching carriage in operative position thereon adjacent the initial position thereof.

Fig. 7 is an end sectional view of the back end of the launching carriage on line 7—7 of Fig. 6.

Fig. 8 is a front end view of the launching carriage on line 8—8 of Fig. 6.

Fig. 9 is a sectional view on line 9—9 of Fig. 1, showing the trigger cocking cam.

Fig. 10 is a sectional view on line 10—10 of Fig. 1.

Fig. 11 is a partly broken away view of the firing valve closing cam.

Fig. 12 is an elevational view of the end of the pneumatic operating engine on arrow 12 of Fig. 1.

Fig. 13 is a sectional view showing a detail for securing the screw cylinders together.

Fig. 14 is a fragmentary view on line 14—14 of Fig. 13.

Fig. 15 is a sectional view through one of the thread lubricating pencils.

Fig. 16 is a fragmentary elevational view of one of the screw cylinder reservoir supporting rollers; and Fig. 17 is a fragmentary view of an alternative form of screw supporting roller.

There is shown at 20 the base on which the catapult is supported. This base 20 is itself supported on a turntable 21 rotatable over a circular trackway 19, whereby the direction that the catapult and base 20 may point may be controlled at will.

Supported at one end of the base 20 is a reversible pneumatic engine 22 of conventional and well known construction, the rotor 23 of which is securely fastened at 24 to one end of a long, hollow screw-threaded cylinder 25, this screw-threaded cylinder 25 being some sixty feet, more or less, in length. This screw-threaded cylinder 25 may be made in one piece or, for convenience, may be made in several sections 26 and 27, each provided with projecting oppositely threaded necks 28 and 29 secured together by a cylindrical shaped nut 30 provided with internal threads 31 which cooperate with the threads on the necks 28 and 29 to draw the same together in pressure-tight and leakproof contact. The cylindrical nut 30 may be provided with wells 32 to receive a suitable wrench for tightening the same. The outside diameter of the cylindrical nut 30 is equal to or less than the diameter at the thread root of the screw-threaded cylinder 25. The cylindrical outer surface of the nut 30 also serves as a supporting trackway for the supporting rollers 33 which are journalled in a bracket 34 mounted within a sunken floor 35 on the base 20, the two rollers 35 thus supporting the screw-threaded cylinder 25 at a point a substantial distance below a horizontal diameter. As many sets of rollers 33 may be provided as there are joining nuts 30 in the length of the screw-threaded cylinder 25.

Additional supports may be provided as desired by means of rollers 36, whose surface 37 is cut into screw threads or teeth which may be rolled into and out of the screw threads. The screw threads on the cylinder 25 may be made continuous, either by making the entire length of the cylinder in one piece or by providing the outer surface of the joining nut 30 with screw threads matched up with the screw threads on the cylinder 25.

Mounted for advancement along the screw-threaded cylinder 25 is a saddle 38 provided with a great plurality of screw threads cooperating with the screw threads on the cylinder 25. This saddle encompasses the screw-threaded cylinder 25 more than 180 degrees, but slightly less than the amount between the rollers 33, whereby the saddle cannot jump off the screw-threaded cylinder 25 yet can freely pass the rollers 33. The length of the saddle is several times the width of the joining nut 30, thus allowing the saddle 38 to continue along the several sections of the cylinder 25 without difficulty. Each screw thread of the saddle 38 is provided with a replaceable graphite pencil 40, held in position by a spring 41 beneath a plug 42, thereby lubricating the screw threads on the cylinder 25 every time the saddle passes thereover.

A carriage 43 is slidably supported by sliders 44 on a pair of tracks 45 extending along opposite sides of the top of the base 20. This carriage 43 is provided at its front end with depending feet 46 which depend in front of a pair of yieldable buffer members 47 on the saddle 38, the carriage 43 being provided with a pair of T shaped grooves 48' slidably receiving T shaped tracks 49' of the saddle 38 therein. As will be apparent, rotation of the screw-threaded cylinder 25 in one direction causes the saddle to advance. The buffer 47 yields slightly, premitting the feet 46 to contact against the sides of the saddle 38 and be drawn along thereby, the buffer 47 thus absorbing part of the shock of starting. At the end of the base 20 the saddle 38 will run beyond the screw-threaded cylinder 25 and the carriage 43 may then be stopped by means of small buffer pistons 48, yieldably mounted thereon and adapted to contact large buffer pistons yieldably extending from the large buffer 50 mounted on the end of the base 20. The small buffer pistons 48 assist in absorbing the stopping shock and allow the large buffers 49 time to get into motion and start absorbing the principal portion of the momentum, it being realized that when the carriage 43 reaches this position it will be travelling at the rate of 75 knots, more or less.

After the cylinder 25 has ceased rotating it may be reversed to withdraw the carriage and saddle to the initial launching position. To do so, a screw-threaded toe 51 yieldably carried in a bracket 52 on the rear of the center of the carriage 43 is depressed by means of a handle 53 against the spring 54, thus serving to draw the carriage 43 and the saddle 38 back to the initial position. The carriage 43 is provided with a T groove floor 54' to which may be secured a suitable aircraft launching cradle (not shown) for holding the aircraft during the travel of the carriage along the length of the screw-threaded cylinder 25 and for releasing it at the end of the travel.

In order to launch the aircraft it is necessary that the screw-threaded cylinder 25 be rotated at a suitably increasing speed so that the aircraft carried thereon will have reached flying speed when the carriage and saddle have reached the end of the base 20 and the stopping buffers go into operation. To insure a quick start, the saddle 38 is temporarily anchored by a reversible breakable link 55, one end being secured to a lug 56 on the saddle 38 and the other end being fitted over a similar lug in the starting position on the base 20. In order to rotate the cylinder 25 the pneumatic engine 22 is operated. The cylinder 25 is hollow and acts as a pneumatic reservoir for the air pressure of anywhere from 1000 to 3000 pounds per square inch for operating the engine 22, according to the sizes of the aircraft to be launched. The air is supplied and replaced in the cylinder 25 by means of a supply pipe 57 extending under the cylinder 25 from one end thereof through a suitable rotatable fitting 58. This supply pipe 57 is provided with a connection 59 leading through the axial center of the turntable 21 and a suitable fitting 60 and conduit 61 through cut-off valve 62 to any suitable compressed air supply. This same pipe 57 extends beyond the connection 59 to lead the cylinder pressure through a pipe 63 and past a firing valve 64, which is connected by a line 65 to the engine, a 4-way valve 67 serving as a reverse valve for disconnecting the lines 65 and 66 and connecting the reverse or retracting line 68 to the pressure line 69, which is tapped in at 70 to the cylinder pressure line 63.

Connected into the retraction pressure line 69 is a throttle valve 71 for controlling the speed of the engine 22 in reverse and for retracting the carriage and saddle. The firing valve 64 serves to admit full pressure of the cylinder to the engine to operate it at maximum speed. When the carriage and saddle have reached the end of their run it is desirable that the firing valve 64 be cut off immediately to save useless waste of air pressure and to stop the rotation of the screw-threaded cylinder 25 as quickly as possible, in order that it may be reversed to withdraw the carriage and saddle to initial launching position, ready for another operation. To do so, the engine 22 is provided with an exhaust line 72 which discharges into an exhaust chamber 73. The other end of the exhaust chamber 73 is open to the atmosphere but is provided with a valve seat 74 against which may close a valve face 75 on a connecting rod 76 whose end has a pin and slot connection 77 to a crank 78 connected by link 79 to a bell crank lever 80. The valve seat 74 and valve face 75 are provided with sufficient openings so that there is no back pressure when the exhaust from pipe 72 discharges into the chamber 73 and to the atmosphere while the valve is in open position. In closed position, however, the valve face 75 and valve seat 74 prevent any quick escape of exhaust to the atmosphere, thereby creating a back pressure, which quickly stops the rotation of the engine 22 and thus of the screw-threaded cylinder 25. The link 79 and bell crank lever 80 are held in open valve position during the initial rotation of the cylinder 25 by means of a spring pressed pawl 81, mounted on the end of the bell crank lever 80. This pawl 81 rests against a rotatable cam 82 which is cut away at 83. This cam 82 is mounted on a rotatable rod 84 provided with a grooved trackway 85 into which extends a tooth 86 on the carriage 43. The grooved trackway 85 extends parallel to the path of the carriage 43, except when it approaches very close to the final launching end where it is curved as at 85' to cause the rod 84 and cam 82 to rotate, bringing the cut away portion 83 into registration with the pawl 81 and thus releasing it. When so released a spring 87 anchored against a bracket 88 pulls a connecting rod 89 secured to the bell crank lever 80. The firing valve 64 is provided with a lever 90 which is abutted by the bell crank lever 80 to move it to the battery or closed position 91. This lever 90 is provided with a lanyard 92 for moving the control valve 64 from battery position to firing position.

In operation, the carriage and saddle are placed at initial launching position adjacent the engine 22 with breakable link 54 in anchoring position. The bell crank lever 80 is placed in position with the pawl 81 against the face of cam 82 and the exhaust valve 74 in open position within the exhaust chamber 73, the valve 67 being placed in position, connecting pressure line 65 to the advanced operating line 66 to engine 22. The lever 90 is placed in battery position 91 and with the aircraft properly positioned on its cradle on carriage 43 the lanyard 92 is pulled to move the lever 90 from position 91 to position 90 against the bell crank lever 80. This admits the pressure from the cylinder 25 to the engine 22, operating it in an advancing position, rotating the screw-threaded cylinder 25 to launch the aircraft by causing the saddle and carriage to travel to the other end thereof. At the other end the buffers come into operation, stopping the carriage and saddle and allowing the aircraft to be catapulted away into the air. As the carriage approaches the end of its travel the tooth 86 rotates cam 82 and releases bell crank lever 80 to close off the firing valve 64 and simultaneously close the exhaust chamber valve 74, thus stopping the rotation of the engine 22.

To retract the carriage and saddle, the threaded toe 51 is pressed down into contact with the screw-threaded cylinder 25, the valve 67 is shifted to connect the tank pressure line 69 to the engine retraction line 68 and the throttle valve 71 operated to control the speed of retraction. Once the engine 22 has come to a stop, the built-up back pressure in the exhaust chamber 73 will escape, due to a small clearance still left within the exhaust chamber between the valve 74 and its face 75. When the carriage and saddle have been retracted to initial position, the catapult is ready for another identical operation.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. An aircraft launching catapult comprising a rotatable constant pitch multi-thread screw and an aircraft catapulting means advanceable along said screw, said aircraft catapulting means comprising a screw saddle partially embracing said screw, a carriage slidably mounted on said saddle, and starting shock buffer means between said carriage and said saddle.

2. An aircraft launching catapult comprising a pneumatic engine, a rotatably mounted longitudinal cylinder secured to said engine, a constant pitch multi-screw thread extending about the longitudinal surface of said cylinder, and an aircraft catapulting means advanceable along said multi-screw thread.

3. An aircraft launching catapult comprising a pneumatic engine, a rotatably mounted longitudinal cylinder secured to said engine, a screw thread extending about the longitudinal surface of said cylinder, an aircraft catapulting means advanceable along said screw thread, said screw threaded cylinder being hollow and providing a pneumatic pressure reservoir therein, and controllable means connecting said reservoir to said pneumatic engine for transmitting the pressure of the reservoir to said engine at will.

4. An aircraft launching catapult comprising a base, a screw type aircraft catapulting means mounted on said base, said screw type catapulting means comprising a hollow cylindrical rotatable screw providing a pneumatic reservoir therein, aircraft carrying means advanceable along said screw and a pneumatic reversible engine at one end of said base for rotating said cylindrical screw and controllable means connecting the reservoir within the hollow screw to the engine to cause the engine to rotate the screw in either direction at will.

5. An aircraft launching catapult comprising a base, a turntable on which said base is mounted, a screw type aircraft catapulting means mounted on said base, said screw type catapulting means comprising a hollow cylindrical rotatable screw, aircraft carrying means advanceable along said screw, a pneumatic reversible engine for rotating said cylindrical screw, said hollow cylindrical screw providing a pneumatic pressure reservoir therein, and controllable means connecting the reservoir to the engine to operate the same in either direction at will.

6. An aircraft launching catapult comprising a base, a screw type aircraft catapulting means mounted on said base, said screw type catapulting means comprising a hollow cylindrical rotatable screw providing a pneumatic pressure reservoir therein, aircraft carrying means advanceable along said screw, and a pneumatic engine at one end of said base operable from the pressure in the pneumatic reservoir within the hollow screw for rotating said cylindrical screw.

7. An aircraft launching catapult comprising a base, a turntable on which said base is mounted, a screw type aircraft catapulting means mounted on said base, said screw type catapulting means comprising a hollow cylindrical rotatable screw providing a pneumatic pressure reservoir therein aircraft carrying means advanceable along said screw, a pneumatic reversible engine at one end of said base for rotating said cylindrical screw, and a controllable means for utilizing the pneumatic pressure from the reservoir in the screw for operating the engine in either direction at will.

8. An aircraft launching catapult comprising a base, a screw type aircraft catapulting means mounted on said base, said screw type catapulting means comprising a cylindrical rotatable screw, aircraft carrying means advanceable along said screw, a pneumatic reversible engine at one end of said base for rotating said cylindrical screw, a controllable means for operating the engine in either direction at will, a buffer means at the other end of said base for stopping the advance of said aircraft carrying means after disengagement from said screw and a temporary screw-engaging means on said aircraft carrying means for retracting said aircraft carrying means into reengagement with said screw as said screw is reversed.

9. An aircraft launching catapult comprising a base, a turntable on which said base is mounted, a screw type aircraft catapulting means mounted on said base, said screw type catapulting means comprising a cylindrical rotatable screw, aircraft carrying means advanceable along said screw, a pneumatic reversible engine at one end of said base for rotating said cylindrical screw, a controllable means for operating the engine in either direction at will, a buffer means at the other end of said base for stopping the advance of said aircraft carrying means after disengagement from said screw, and temporary screw-engaging means on said aircraft carrying means for retracting said aircraft carrying means into reengagement with said screw as said screw is reversed.

LISLE J. MAXSON.
FREDERICK B. GROSS.